United States Patent
Rechterman et al.

(10) Patent No.: US 7,979,493 B2
(45) Date of Patent: * Jul. 12, 2011

(54) CUSTOMIZE AN EMAIL USING AN EXPERTISE LEVEL RULES ENGINE

(75) Inventors: Barbara J. Rechterman, Desert Hills, AZ (US); Neil Proctor, Scottsdale, AZ (US); Shawn Fitzpatrick, Phoenix, AZ (US); Bill Bennett, Phoenix, AZ (US)

(73) Assignee: The Go Daddy Group, Inc., Scottsdale, AZ (US)

( * ) Notice: Subject to any disclaimer, the term of this patent is extended or adjusted under 35 U.S.C. 154(b) by 27 days.

This patent is subject to a terminal disclaimer.

(21) Appl. No.: 11/861,201

(22) Filed: Sep. 25, 2007

(65) Prior Publication Data

US 2008/0010356 A1   Jan. 10, 2008

Related U.S. Application Data

(62) Division of application No. 10/944,377, filed on Sep. 17, 2004, which is a division of application No. 10/944,636, filed on Sep. 17, 2004, which is a division of application No. 10/944,645, filed on Sep. 17, 2004.

(51) Int. Cl.
*G06F 15/16* (2006.01)
(52) U.S. Cl. .............. 709/206; 707/5; 707/10
(58) Field of Classification Search .......... 709/206; 706/45, 62; 707/9, 999.003, 1; 434/362; 379/266.01; 705/7.14
See application file for complete search history.

(56) References Cited

U.S. PATENT DOCUMENTS

| | | | |
|---|---|---|---|
| 5,793,972 | A | 8/1998 | Shane |
| 5,809,242 | A | 9/1998 | Shaw et al. |
| 5,832,100 | A | 11/1998 | Lawton et al. |
| 5,838,461 | A | 11/1998 | Hsieh |
| 5,848,396 | A | 12/1998 | Gerace |
| 5,857,175 | A | 1/1999 | Day et al. |
| 5,870,724 | A | 2/1999 | Lawlor et al. |

(Continued)

OTHER PUBLICATIONS

Sep. 15, 2010 Non-Final Rejection, U.S. Appl. No. 10/944,645 (Publication US 2006-0064637 A1).

(Continued)

*Primary Examiner* — Dustin Nguyen
(74) *Attorney, Agent, or Firm* — Stewart J. Womack; Chris A. Watt

(57) ABSTRACT

A Web site, through the use of a Rules Engine, determines an expertise level of a User for one or more topics on a Web page. The Rules Engine may analyze User related data, such as the search term used by the User to find the Web site, the past products purchased by the User, the path through the Web site taken by the User, the usage history by the User on the Web site, the demographics of the User and/or the self declared expertise level of the User, to determine an expertise level of the User for the topics on the Web page. A Display Engine may customize a Web page based on the expertise levels of a User so that topics on the Web page are presented in a manner most appropriate for the User. An Email Engine may be used to customize emails to the User so that topics in the email are presented in manner most appropriate for the User. A Support Entity Engine may also be used to route an incoming support inquiries from a User to an appropriate technical support person for the User.

10 Claims, 15 Drawing Sheets

U.S. PATENT DOCUMENTS

| | | | |
|---|---|---|---|
| 5,887,133 A | 3/1999 | Brown et al. | |
| 5,905,862 A | 5/1999 | Hoekstra | |
| 5,983,351 A | 11/1999 | Glogau | |
| 6,009,410 A | 12/1999 | LeMole et al. | |
| 6,014,638 A | 1/2000 | Burge et al. | |
| 6,091,930 A * | 7/2000 | Mortimer et al. | 434/362 |
| 6,092,101 A | 7/2000 | Birrell et al. | |
| 6,195,426 B1 * | 2/2001 | Bolduc et al. | 379/266.01 |
| 6,298,341 B1 | 10/2001 | Mann et al. | |
| 6,385,592 B1 | 5/2002 | Angles et al. | |
| 6,405,192 B1 | 6/2002 | Brown et al. | |
| 6,484,149 B1 | 11/2002 | Jammes et al. | |
| 6,505,166 B1 * | 1/2003 | Stephanou | 705/7.14 |
| 6,519,589 B2 | 2/2003 | Mann et al. | |
| 6,560,634 B1 | 5/2003 | Broadhurst | |
| 6,594,654 B1 * | 7/2003 | Salam et al. | 707/999.003 |
| 6,615,241 B1 | 9/2003 | Miller et al. | |
| 6,615,247 B1 | 9/2003 | Murphy | |
| 6,745,248 B1 | 6/2004 | Gardos et al. | |
| 6,757,661 B1 | 6/2004 | Blaser et al. | |
| 6,789,103 B1 | 9/2004 | Kim et al. | |
| 6,880,007 B1 | 4/2005 | Gardos et al. | |
| 6,895,430 B1 | 5/2005 | Schneider | |
| 7,319,992 B2 * | 1/2008 | Gaos | 706/62 |
| 2002/0035611 A1 | 3/2002 | Dooley | |
| 2002/0049727 A1 * | 4/2002 | Rothkopf | 707/1 |
| 2002/0065903 A1 | 5/2002 | Fellman | |
| 2002/0091827 A1 | 7/2002 | King et al. | |
| 2002/0129013 A1 | 9/2002 | Thomas | |
| 2002/0188583 A1 * | 12/2002 | Rukavina et al. | 706/45 |
| 2003/0126027 A1 * | 7/2003 | Nelson et al. | 705/26 |
| 2003/0233345 A1 | 12/2003 | Perisic et al. | |
| 2004/0044791 A1 | 3/2004 | Pouzzner | |
| 2004/0068460 A1 | 4/2004 | Feeley et al. | |
| 2004/0167982 A1 | 8/2004 | Cohen et al. | |
| 2004/0199496 A1 | 10/2004 | Liu et al. | |
| 2004/0247092 A1 | 12/2004 | Timmins et al. | |
| 2004/0249709 A1 | 12/2004 | Donovan et al. | |
| 2004/0249978 A1 | 12/2004 | Marappan et al. | |
| 2004/0267723 A1 | 12/2004 | Bharat | |
| 2005/0055321 A1 | 3/2005 | Fratkina et al. | |
| 2005/0102354 A1 | 5/2005 | Hallenbeck et al. | |
| 2006/0004763 A1 * | 1/2006 | Horvitz et al. | 707/9 |

OTHER PUBLICATIONS

Dec. 8, 2010 Response to Sep. 15, 2010 Non-Final Rejection, U.S. Appl. No. 10/944,645 (Publication US 2006-0064637 A1).

Nov. 15, 2010 Non-Final Rejection, U.S. Appl. No. 10/944,645 (Publication US 2006-0064637 A1).

Dec. 28, 2010 Response to Nov. 15, 2010 Non-Final Rejection, U.S. Appl. No. 10/944,645 (Publication US 2006-0064637 A1).

* cited by examiner

CUSTOMIZE AN EMAIL USING AN EXPERTISE LEVEL RULES ENGINE

CROSS REFERENCE TO RELATED PATENT APPLICATIONS

This divisional application claims the benefit of U.S. patent application Ser. No. 10/944,377; U.S. patent application Ser. No. 10/944,636; and U.S. patent application Ser. No. 10/944,645; all filed on Sep. 17, 2004. This divisional application is being concurrently filed with U.S. patent application Ser. No. 11/861,225.

FIELD OF THE INVENTION

The present invention relates to methods for determining one or more expertise levels of a User for one or more topics on a Web page, and customizing the Web page, an email or a routing system for a customer service center call according to the expertise level of the User for the relevant topic.

BACKGROUND OF THE INVENTION

The Internet is a worldwide network of computers and computer networks arranged to allow for the easy and robust exchange of information or topics between the users of the computers. Hundreds of millions of people around the world have access to computers connected to the Internet via one of the hundreds of Internet Service Providers (ISPs). Content providers may place multimedia information, i.e. graphics and sounds, and other forms of data on servers located at specific locations on the Internet. The information on a server may be accessed over the Internet by a User in order to retrieve the information. A client application, such as a browser or a smart client, may be used by the User to transmit and receive information from the server. The information may be communicated to the User in any desired format, but is often presented to the User in the form of a Web page.

A Web site may have a front end, i.e. Web pages, and a back end, the hardware and software necessary for the Web site to communicate over the Internet. The hardware will typically include a server (a single server may actually support a large number of Web sites) and a communication path between the Web site and the Internet. The software will typically include the software packages necessary to perform the desired functions of the Web site. The software allows for fast analysis of data and the automated performance of the desired functions on the Web site. Web sites may perform complicated functions and data manipulations for a large number of Users all substantially simultaneously.

Each Web site may include one or more Web pages. Web pages may be created using HyperText Markup Language (HTML) to generate a standard set of tags that define how the Web page will be displayed. Users of the Internet may access content providers' Web sites using a software package known as a browser, such as MICROSOFT INTERNET EXPLORER or NETSCAPE NAVIGATOR. After the browser has located a desired Web site, the browser requests and receives data regarding one of the Web pages from the Web site, typically in the form of an HTML document. The browser will then display the Web page's content for the User on the User's computer. The User may thereafter view other Web pages on the same Web site or move to an entirely different Web site using the browser.

Some conventional Web sites allow Users to make modifications to the Web site's appearance. For example, some conventional Web sites allow Users to select a color scheme for the Web site or even select certain default settings on the Web site according to preferences selected by the User. Conventional Web sites may also allow some Users to skip Web pages with previously viewed/already known information while also allowing Users to view other Web pages with additional information, such as a commonly used frequently asked questions (FAQs) Web page. In addition, some conventional Web sites allow Users to select a topic in order to receive additional or more detailed information regarding the topic.

Applicants have noticed that problems still exist for Users accessing information from a Web page. While Users may select particular Web pages and Web page topics for information, the presentation of the information on any given Web page is at a fixed expertise level. Expertise levels may vary from Web site to Web site or even Web page to Web page, but the expertise level for any given Web page is fixed for every User that views that Web page. In other words, every User that selects a Web page will receive content from the Web page at the same expertise level as every other User that selects that Web page.

Conventional Web pages do not present topics to individual Users based on the User's expertise level. While some Web pages may be directed towards novices (or even children) and other Web pages may be directed towards experts in the field, every conventional Web page presents their topics to Users at a fixed expertise level. While a "novice" expertise level Web page and an "expert" expertise level Web page may exist on the same Web site, Web pages do not change expertise levels based on the expertise levels of their Users. The result is that Users often receive information that is either too advanced for them to fully understand or too simple and does not add to their understanding of the topic being presented.

The problem is further compounded when multiple topics are presented on the same Web page. Any given User may, for example, be an expert on one topic while being a novice on another topic, even for topics presented on the same Web page. Conventional Web pages typically present the information for all their topics at the same expertise level thereby virtually insuring a mismatch for Users having different levels of expertise for different topics on the same Web page.

Many Web sites find it advantageous to send emails to their Users, who are often their Customers. Conventional Web sites transmit emails to their Users at a fixed expertise level, assuming that not only do all their Users have the same expertise level, but that all their expertise levels is about at the same expertise level as the expertise level of the email. These are both almost always faulty assumptions. Users of Web sites typically have a broad range of expertise levels for the topics presented in the emails, thus guarantying that at least some of the Users will not receive emails created with an expertise level appropriate for the User's expertise level. The problem is further compounded for emails that have more than one topic in which Users may have different expertise levels for each of the topics.

Some conventional Web sites, typically for those running a business, have an associated call center for answering their Users' questions regarding the Web site's services and/or products. The call centers receive incoming calls from their Users and route each User to a technical support person to assists the User. Applicants have noticed that not all Users and not all technical support persons have the same expertise level (of course, technical support persons on average typically have a higher expertise level than the Users) for all of the services and products offered by the Web site. The Users commonly have a broad range of expertise levels amongst themselves for each of the different services and products offered by the Web site. Likewise, technical support persons have different expertise levels for different services and products offered by the Web site. The failure of the call center to consider the expertise level of the User when routing the User's call to a technical support person often results in the technical support person either talking above the expertise level of the User or the technical support person being unable to answer or address more advanced issue that a higher expertise level User may have.

Thus, there is a need for a Web site to match the presentation of each topic on its Web page based on the expertise level for the User's expertise level for each topic. There is also a need to transmit customized emails to the Users of a Web site so that the expertise level of each email corresponds to the expertise level of the User receiving the email. There is also a need to route a User calling a customer service center to a technical support person that has an expertise level appropriate for the expertise level of the User.

SUMMARY OF THE INVENTION

The present invention addresses these needs by providing improved methods for designing and customizing a Web page, email and routing system for a call center based on the User's expertise level for the topic(s) in the Web page, email and service call.

In one embodiment of the invention, a method is disclosed for a client application to receive customized information from a server. In this embodiment, a User uses a client application to select information from a server, wherein the information has at least a first topic. The server identifies a first expertise level of the User for the first topic. The server customizes the format of the information based on the first expertise level of the User for the first topic. Finally, the server transmits the customized information to the client application. The server and the client application may communicate with each other over any communication network, such as, but not limited to, wireless telephone networks, the Internet or a combination of communication networks. The transmitted information may include more than a first topic and an expertise level for the additional topic(s) may also be found and used to customize the information transmitted to the client application.

In another embodiment of the invention, a method is disclosed for customizing a Web page in a Web site based on a User's expertise level. In this embodiment, a User selects to view a Web page, on a Web site, having a first topic and a second topic. The Web site identifies a first expertise level of the User for the first topic and, preferably, also for the second topic. The Web site designs and customizes the Web page using the first expertise level of the User for the first topic, and, preferably, also for the expertise level of the User for the second topic. The Web site may then display the customized Web page to the User. As a further improvement, additional topics and expertise levels of the User for those topics may be found and used during the customization process of the Web page for the User.

In another embodiment of the invention, a method is disclosed for customizing a Web page in a Web site based on a User's expertise level. In this embodiment, a User selects to view a Web page, in a Web site, having a first topic and a second topic. The Web site identifies an expertise level of the User for the first topic. Finally, the Web site selects a product to display for the User to purchase based on the expertise level of the User for the first topic. Further improvements to this embodiment may be made by determining the expertise level of the User for more than just the first topic.

In another embodiment of the invention, a method is disclosed for customizing a Web page based on a User's dynamic expertise level. In this embodiment, a User selects to view a Web page, on a Web site, having a topic. The Web site identifies an expertise level of the User for the topic at a first time. The Web site customizes and displays the Web page to the User based on the expertise level of the User for the topic at the first time. The User selects to view the Web page at a time after the first time. The Web site identifies a subsequent expertise level of the User for the topic at the second time. The Web site customizes and displays the Web page to the User based on the subsequent expertise level. Further improvements may be made to this embodiment by continuing to monitor a User's expertise level (which is likely to increase over time) and customizing the Web page to match the User's current expertise level for the topics presented on the Web page.

In another embodiment of the invention, a method is disclosed for a client application to customize information received from a server for presentation to a User. In this embodiment, a User uses a client application to select information from a server, wherein the information has at least a first topic. The client application may be, for example, a browser or a smart client and may reside on any type of client. The server transmits the information to the client application over a communication network. The client application identifies a first expertise level of the User for the first topic. Finally, the client application customizes the format of the information based on the first expertise level of the User for the first topic. In preferred embodiments, additional expertise level(s) of the User for additional topic(s) may be used in customizing the information.

In another embodiment of the invention, a method is disclosed for customizing a Web page based on a search term entered into a Search Engine. In this embodiment, a User enters a search term into a Search Engine. The Search Engine displays a plurality of links to a plurality of Web sites to the User. The User selects a link to a Web site. The Search Engine transmits to the Web site the search term entered by the User. A Rules Engine determines a search term expertise level of the User based on the search term. The Web site may customize and display a Web page to the User based on the search term expertise level of the User. Further improvements may be made in customizing and transmitting the Web page by also using expertise levels of the User for particular topics previously found by the Web site.

In another embodiment of the invention, a method is disclosed for customizing a Web page based on a search term entered into a Search Engine by a User. In this embodiment, a User enters a search term into a Search Engine. The Search Engine displays a plurality of links to a plurality of Web sites to the User. The User selects a link to view a Web page on a Web site. The Search Engine communicates the search term to the Web site. The Web site uses a Rules Engine to determine a search term expertise level of the User based on the search term. The Web site offers a product for sale to the User based on the search term expertise level of the User. Further improvements may be made by selecting the product to offer for sale to the User based on the expertise level of the User for various topics on the Web pages in the Web site.

In another embodiment of the invention, a method is disclosed for customizing a Web page based on a search term entered into a Search Engine by a User. In this embodiment, a User enters a search term into a Search Engine. The Search Engine displays a plurality of links to a plurality of Web sites to the User. The User selects a link to view a Web page on a Web site having a topic. The Web site customizes the Web page using the search term and displays the Web page to the User. The Web site identifies an expertise level of the User for the topic at a subsequent time. Finally, the Web site customizes the Web page using the expertise level of the User for the topic at the subsequent time and displays the Web page to the User. Further improvements may be made to this embodiment by continually monitoring the expertise level of the User over time and designing and customizing the Web page based on the current expertise level of the User for the topics on the Web page.

In another embodiment of the invention, a method is disclosed of using an expertise level Rules Engine to customize a User interface of a Web page. In this embodiment a Web site obtains User related data. The Web site enters the User related data into a Rules Engine. The Rules Engine enters a first and a second expertise level for a first and a second topic, respectively, for the User into a Display Engine. The Display Engine creates a customized User interface using the first and the second expertise level. Finally, the Web site displays the customized User interface to the User. Further improvements may be made to this embodiment by determining the different expert levels of the User for the different topics on the Web pages of the Web site by examining the usage patterns of the User on the Web site.

In another embodiment of the invention, a method is disclosed of using an expertise level Rules Engine to customize an e-mail to a User. In this embodiment a Web site obtains some User related data. The Web site enters the User related data into a Rules Engine. The Rules Engine determines a first and a second expertise level, for a User, for a first and a second topic, respectively. The Web site, through an email engine, creates an email using the first and the second expertise level of the User. Finally, the Web site, through the email engine, transmits the email to the User. Further improvements may be made to this embodiment by finding expertise levels of the User for the topics in the email and then matching the content of the email to the expertise level of the User to the topics in the email.

In another embodiment of the invention, a method is disclosed of using an expertise level Rules Engine to customize the handling of support inquiries to a support entity. The support inquires and support entity may include as examples a service call to a call center, an email to a web tech service board, or other requests for service that get routed to a customer service representative. In this embodiment a Web site obtains some User related data. The Web site enters the User related data into a Rules Engine. The Rules Engine determines an expertise level for the User. A support entity is contacted by the User. Finally, the support entity routes the User to one technical support person out of a plurality of technical support persons based on the determined expertise level of the User. This method increases the efficiency of the support entity by immediately matching advanced Users with more experience technical support persons that are more likely to be able to solve the more advanced issues of advanced Users.

In another embodiment of the invention, a method is disclosed for using an expertise level Rules Engine to customize the handling of support inquiries to a support entity. For example, the support inquiry may be a service call and the support entity may be a service call center. In this embodiment, a Web site obtains some User related data. The Web site enters the User related data into a Rules Engine. The Rules Engine determines a first and a second expertise level for the User for a first and a second topic, respectively. A call center receives a call from the User. The call center determines whether the call is related to the first topic or the second topic. Finally, the call center routes the call from the User to a technical support person out of a plurality of technical support persons based on the expertise level of the User for the first or the second topic related to the call. Further improvements may be made by determining an expertise level of the User for as many topics as possible on the Web site so that an expertise level of the User for the topic of the service call may be immediately determined.

Additional advantages and aspects of the present invention will become apparent in the following detailed description and claims.

DETAILED DESCRIPTION OF THE PREFERRED EMBODIMENTS

Figure 1:
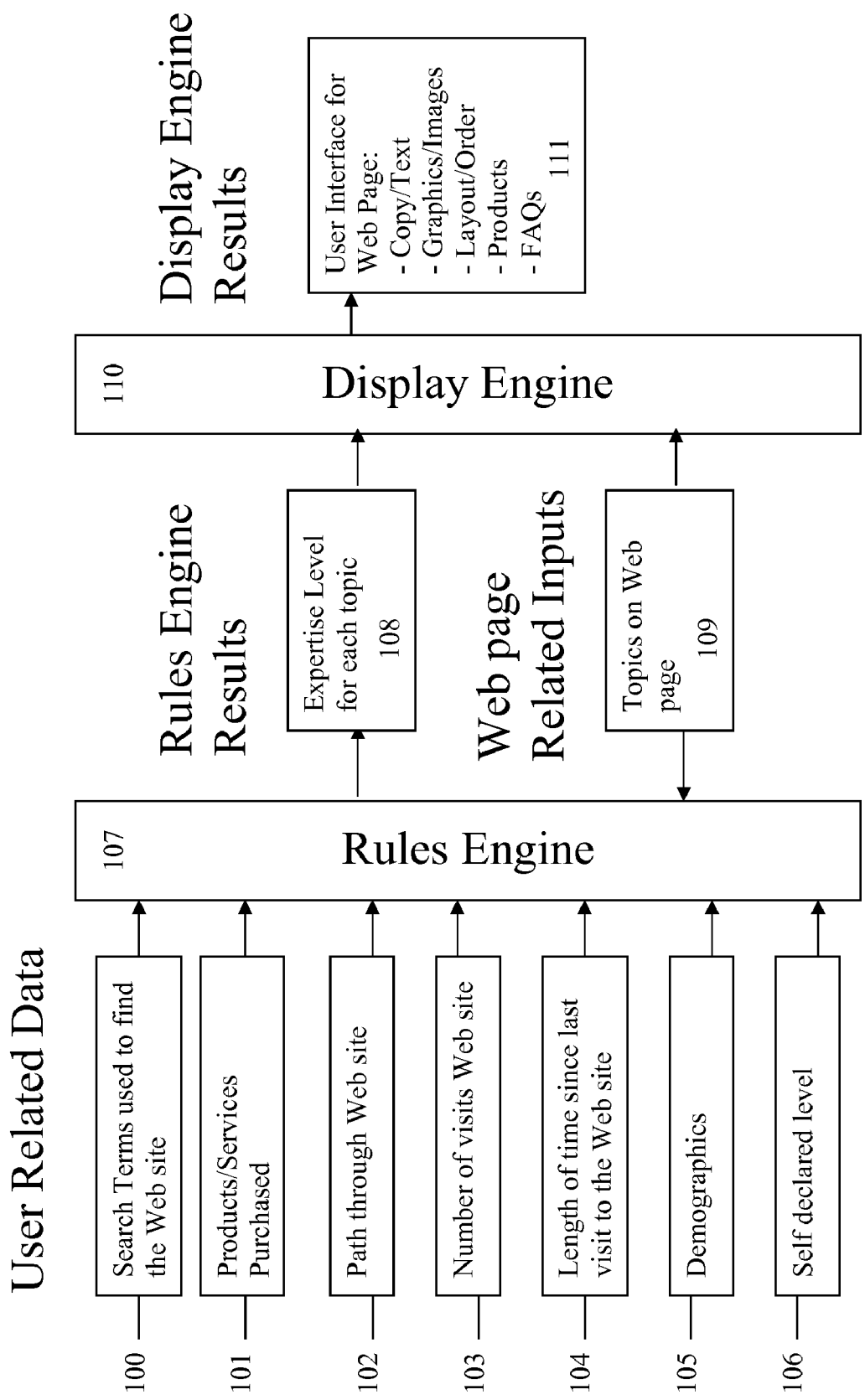
FIG. 1 is a block diagram illustrating the flow of information through a process for customizing a Web page based on a User's expertise level.

The present invention will now be discussed in detail with regard to the attached drawing figures which were briefly described above. In the following description, numerous specific details are set forth illustrating Applicants' best mode for practicing the invention and for enabling one of ordinary skill in the art to make and use the invention. It will be obvious, however, to one skilled in the art that the present invention may be practiced without many of these specific details. In other instances, well-known machines and process steps have not been described in particular detail in order to avoid unnecessarily obscuring the present invention. Unless otherwise indicated, like parts and processes are referred to with like reference numerals.

With reference to FIG. 1, the flow of information through processes for designing, customizing and transmitting a Web page, and its associated User interface, is illustrated. One or more User related data may be used as inputs into a Rules Engine 107. The User related data may include, but is not limited to, search terms entered by the User into a search engine 100, past products purchased by the User 101, the path the User used to navigate through the Web site 102, the number of visits to the Web site 103, the length of time since the last visit 104 (usage patterns), demographics of the User 105 and/or a self declared expertise level of the User 106. The User related data may be gathered from the current visit to the Web site, previous visits to the Web site or from other Web sites that have accessible data regarding the User.

The topics on most Web pages tend to be related, but may be different enough that a User may be familiar with some of the topics while unfamiliar with other topics. For example, on a Web page operated by an Internet domain name registrar that offers various Internet services, one topic may be related to registering domain names, a second topic may deal with hosting accounts, while yet a third topic discusses information regarding email accounts, all on the same Web page. A User may easily have different levels of expertise for each of the topics on a single Web page. The number and combination of topics on a Web page are only limited by the imagination and desire of the Web site operator.

A Web site, or a Rules Engine 107 within a Web site, may perform the function of determining an expertise level for the User for one or more topics on the Web page based on the clues provided in the User related data. The Rules Engine 107 may accept the User related data, score the User related data for a particular topic and assign the score to the User's expertise level for that topic. The Rules Engine 107 may indicate a higher expertise level for a User if the User used a very technical or sophisticated method of describing the topic, while indicating a lower expertise level of the User if the User used very generic or basic language as the search term. In certain embodiments, the Rules Engine 107 may also reside on a server not associated with a Web site or on a client as part of a client application.

Product previously purchases 101 by the User may provide very powerful clues as to the expertise level of the User to the Rules Engine 107. The more products purchased, the more likely the User is familiar with the products purchased. The path taken through a Web site may also be used to provide useful information to a Rules Engine 107. If the User selected short-cuts or a direct path (for example without viewing the FAQs), the Rules Engine 107 may determine the User has a higher level of expertise level than Users who meander through the Web site as if they are first time visitors to the Web site. The usage pattern of the Web site by the User (number 103 and length of previous visits 104) may also provide valuable information to the Rules Engine 107. The more often the User has visited the Web site, the higher the assigned expertise level and the lower the need to provide basic information to the User. Demographics 105 of the User may also be used by the Rules Engine 107 to determine an expertise level of the User regarding different topics. Of course, one of ordinary skill in the art will recognize that other User related data and methods of analyzing User related data may be used for determining an expertise level of a User.

In a preferred embodiment, the User may be given a chance to self declare their expertise level 106. This would allow, for example, an otherwise perceived advanced expertise level User to receive refresher information if so desired or allow an otherwise perceived beginner expertise level User to see highly detailed information that might have otherwise been assumed too advanced for the User's level of understanding. The User's self declared expertise level 106 may be used to override all other User related data by the Rules Engine 107 and the Rules Engine 107 may assign the self declared expertise level to the expertise level of the User.

The User related data used by the Rules Engine 107 is not limited to just the items previously listed and not all of the items listed need to be used in every embodiment of the invention. Depending on the purpose of the Web site, other types of User related data may also be used by the Rules Engine 107 to determine an expertise level of the User for one or more topics presented by the Web page.

The Rules Engine 107 may also receive data regarding the topics on a Web page 109. It should be noted that Web sites typically have a plurality of Web pages and more than one Web page may be processed at a time by the Rules Engine 107. The Rules Engine 107 may determine an expertise level of the User for one or more topics on the Web page. In preferred embodiments, an expertise level is found for as many of the topics on the Web page as possible. This permits the greatest possible customization of the Web page for a User. For example, if 10 discreet topics are illustrated on a Web page, it is preferred that 10 expertise levels are found for the User, one for each topic. Due to the particular nature of some topics, it may be desirable to present some topics identically to all Users irregardless of their expertise level for the topic. In this case, the expertise level for that topic may be disregarded.

It may not always be possible to determine an expertise level for all the topics in a Web page for a User as relevant User related data may not be available or too difficult to obtain for one or more topics. In such a case a default expertise level may be assigned to the User for those topics. It is preferred to assign the most common expertise level of Users as a default, but other default expertise levels may also be used where an expertise level of a User for a particular topic cannot be determined by the Rules Engine 107.

The expertise levels for each topic 108 on the Web page may be expressed on any desired scale. As one non-limiting example, the Rules Engine 107 may assign a User a "novice", "intermediate" or "advanced" expertise level for one or more topics on a Web page. While three discreet expertise levels are illustrated in this example, in practice, any number of expertise levels may be used. As another example, an expertise level for a given topic may be expressed on a scale from one to 100. The scale of the expertise levels may also be changed from topic to topic, even on the same Web page. For example, one topic on a Web page may use a scale with two expertise levels, e.g. beginner, expert, while another topic on the same Web page may be expressed with ten expertise levels.

While the expertise level 108 of a User will commonly refer to the technical level or depth of understanding of the User for a given topic, the term is not so limited. In some applications, it may be desirable for the expertise level 108 of the User to refer to a "User's type". For example, an expertise level 108 for a User may classify a User's expertise level as a "personal account", "home business", "small business" or "corporate account". As another example the expertise level may be scaled as "tech savvy", "tech comfortable" or "beginner". An expertise level having a User's type may be very useful in deciding how to design and customize a Web page for the User.

In preferred embodiments, the scale of the expertise level 108 is selected so as to provide the best possible input into a Display Engine 110. The Display Engine 110 accepts one or more expertise level(s) for a User and customizes a selected Web page for the User based on the User's expertise level(s). The Display Engine 110 may start with a general layout or template of the Web page and customizes the Web page based on the User's expertise levels for one or more topic(s) on the Web page. It is also possible for the Web page to be designed where topics of interest for the User are positioned in a prominent location. For example, if a User has a high expertise level in a given topic, signifying an interest in that topic, information regarding that topic may be placed at the top of the information presented to the User. In other embodiments of the invention, the expertise level of a User for a particular topic or topics can be used to direct the User through a particular path on a Web site. For example, links or other methods for traversing a Web site may be prominently displayed that direct the User to content appropriate for their expertise level. A Web site may even automatically take a User to a Web page appropriate for their level. For example, a User having a low expertise level may be taken to an introductory Web page while an advanced User may be taken to a Web page discussing the latest upgrades to the Web site's products or services.

The customization of a Web page will may alter the User interface for the Web page which may include one or more of the following: copy (text), graphics, images, layout, order of items and/or products offered or highlighted 111 on the Web page. This is a non-limiting list and anything used by a Web page may be customized by the Display Engine 110 based on the expertise level 108 of the User. In preferred embodiments, the higher or more advanced the expertise level of the User for a topic, the smaller and more detailed the text and the smaller and fewer the graphics and images for the topic.

Users with a higher expertise level may receive advanced topics explained in highly technical language without the presentation of basic concepts or introductory material. On the other hand, Users with a lower expertise level for a topic may be offered very basic information on the topic written in a larger font accompanied by larger images or graphics and written at an introductory level. In addition, lower level expertise level Users may receive prominent links to a frequently asked questions (FAQs) section or links to other sources of beginner's information.

Once the Display Engine has designed and customized a Web page based on the expertise level(s) of the User for the topic(s) on the Web page, the Display Engine may assist in the process of transmitting the Web page, typically written in HTML, over the Internet to the User's browser so the User may view the Web page on the User's computer.

Figure 4:
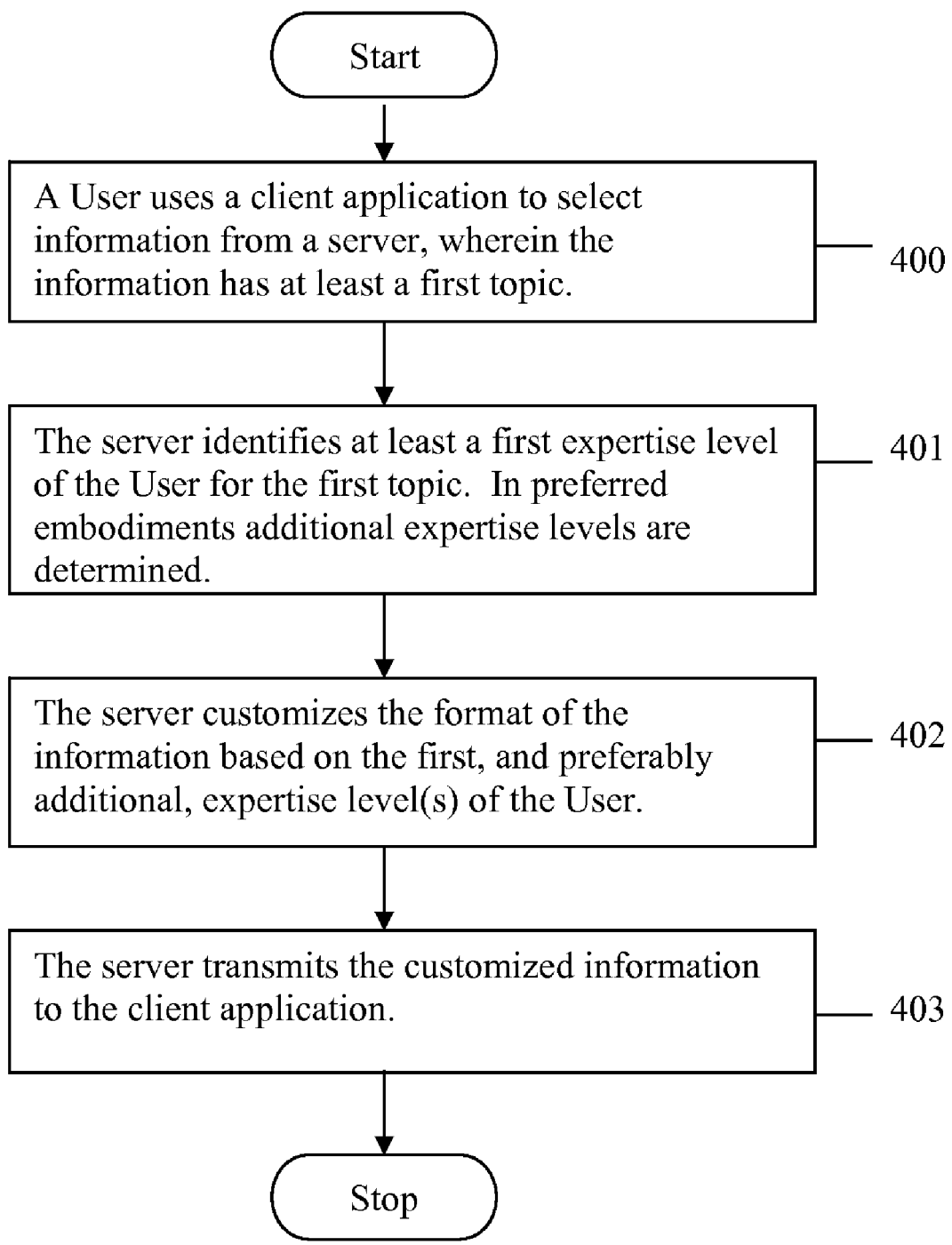
FIG. 4 is a flowchart illustrating a method for customizing and transmitting information based on a User's expertise level between a server and a client application.

With reference to FIG. 4, a method is disclosed for a client application to receive customized information from a server. In this embodiment, a User uses a client having a client application to select information from a server, wherein the information has at least a first topic. (Step 400) The server identifies a first expertise level of the User for the first topic. (Step 401) The server customizes the format of the information based on the first expertise level of the User for the first topic. (Step 402) Finally, the server transmits the customized information to the client. (Step 403) The server and the client application may communicate with each other over any communication network, such as, but not limited to, wireless telephone networks, the Internet or a combination of communication networks. The transmitted information may include more than a first topic and an expertise level for the additional topic(s) may also be found and used to customize the information transmitted to the client application. While the information may comprise a Web page, other formats or protocols of information may also be transmitted from the server to the client application. The server may be any device that stores information and allows access to the information via a communication network. A client may be a computer, telephone or other device that receives information from a server. The client application resides on the client and may be a browser, a smart client or any other application for presenting the information to the User.

Figure 5:
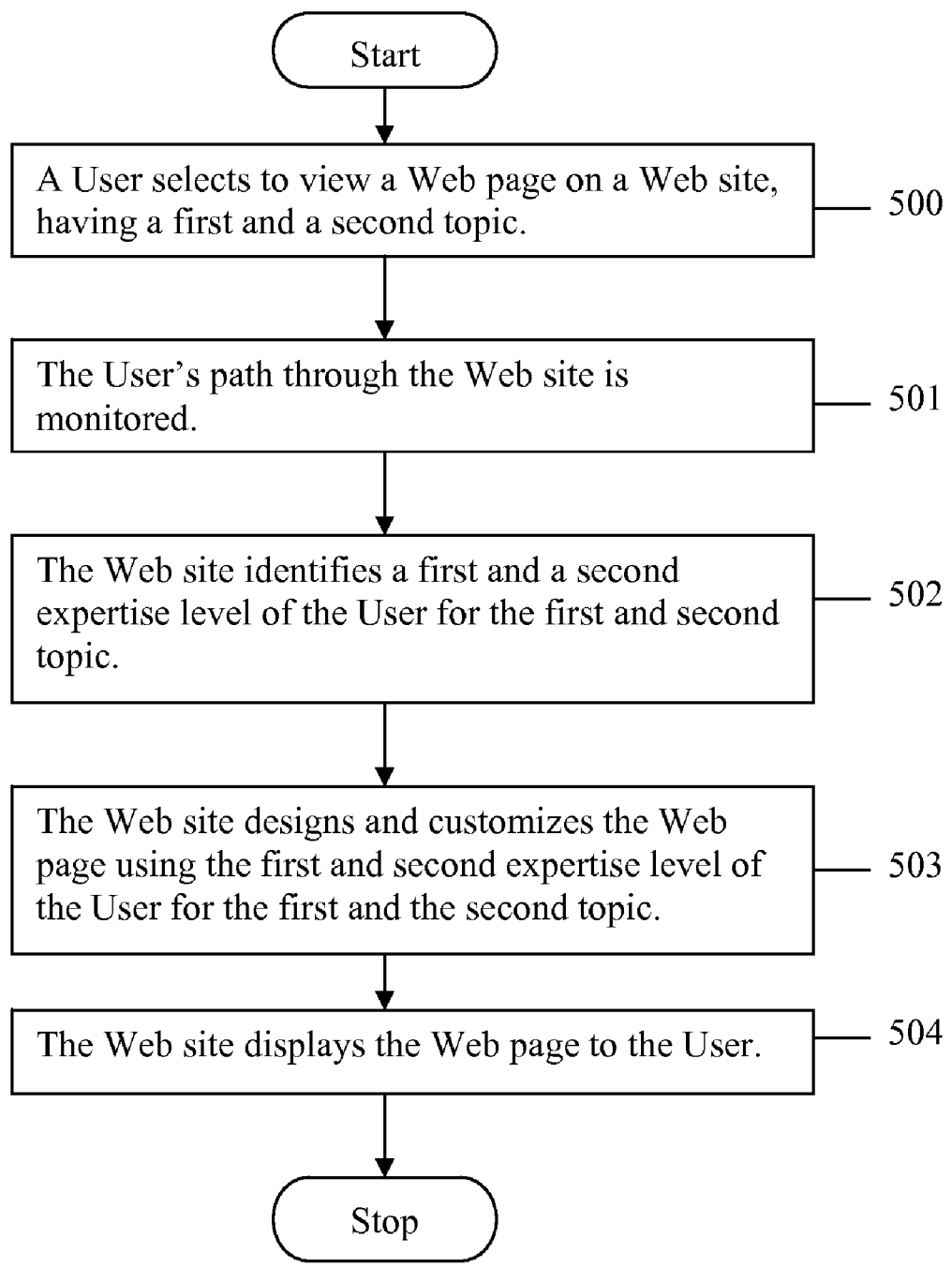
FIG. 5 is a flowchart illustrating a method for customizing and transmitting a Web page based on the expertise levels of a User.

With reference to FIG. 5, a method is disclosed for customizing a Web page in a Web site based on a User's expertise level. In this embodiment, a User selects to view a Web page, on a Web site, having a first topic and a second topic. (Step 500) The Web site identifies a first expertise level of the User for the first topic and, preferably, also for the second topic. (Step 502) The Web site designs and customizes the Web page using the first expertise level of the User for the first topic, and, preferably, also for the expertise level of the User for the second topic. (Step 503) The Web site may then display the customized Web page to the User. (Step 504) In preferred embodiments, additional topics and expertise levels of the User for those topics may be found and used during the customization process of the Web page for the User.

Figure 6:
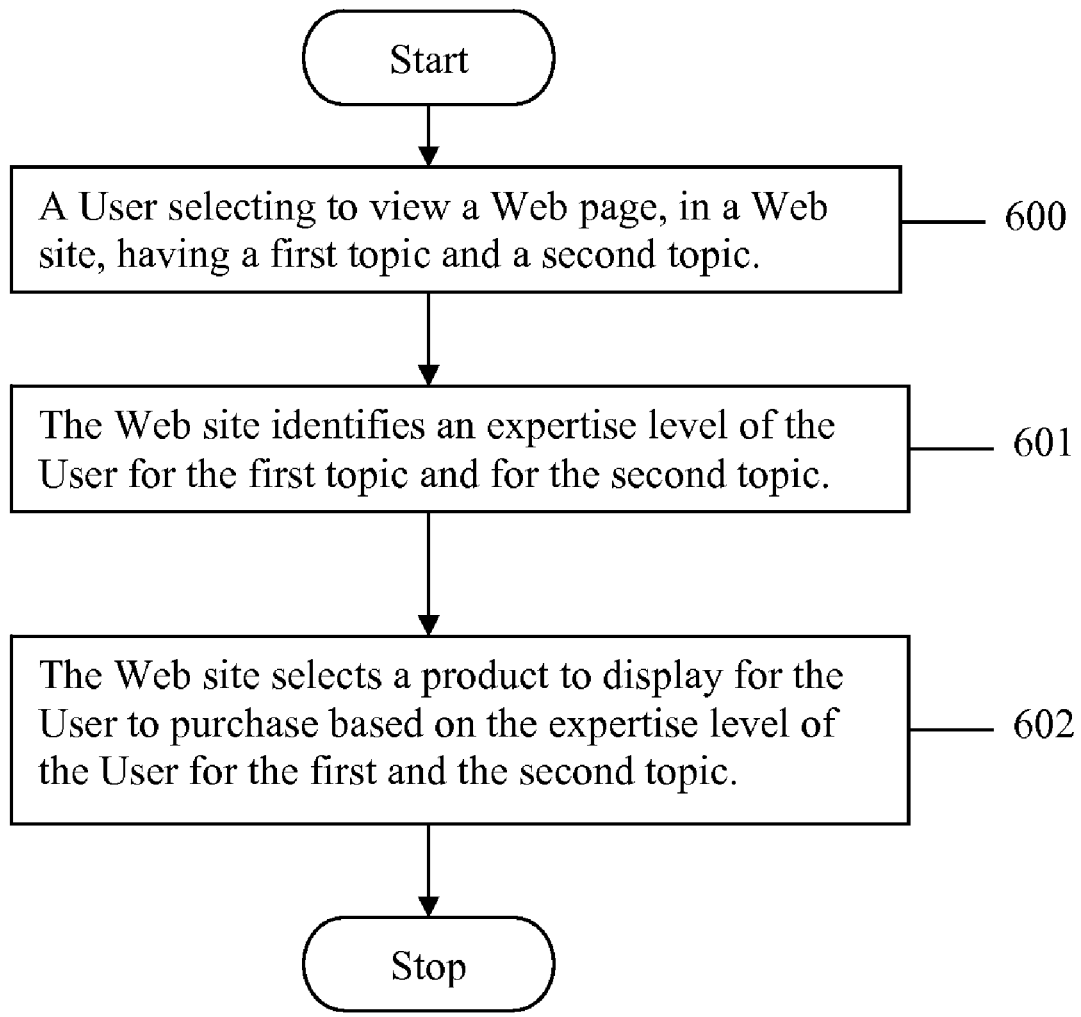
FIG. 6 is a flowchart illustrating a method for selecting a product to offer a User, i.e. Customer, based on the expertise level of a User.

With reference to FIG. 6, a method is disclosed for customizing a Web page in a Web site based on a User's expertise level. In this embodiment, a User selects to view a Web page, in a Web site, having a first topic and a second topic. (Step 600) The Web site identifies an expertise level of the User for the first and second topic. (Step 601) Finally, the Web site selects a product to display for the User to purchase based on the expertise level of the User for the first and second topic. (Step 602) While this embodiment may be accomplished analyzing only a single topic, the more topics analyzed may improve the selection of the product to offer the User. For products or services that are typically repeatedly purchased by a User, past purchasing behavior of a User may be an excellent indicator of the products that should be highlighted or offered for sale to the User.

Figure 7:
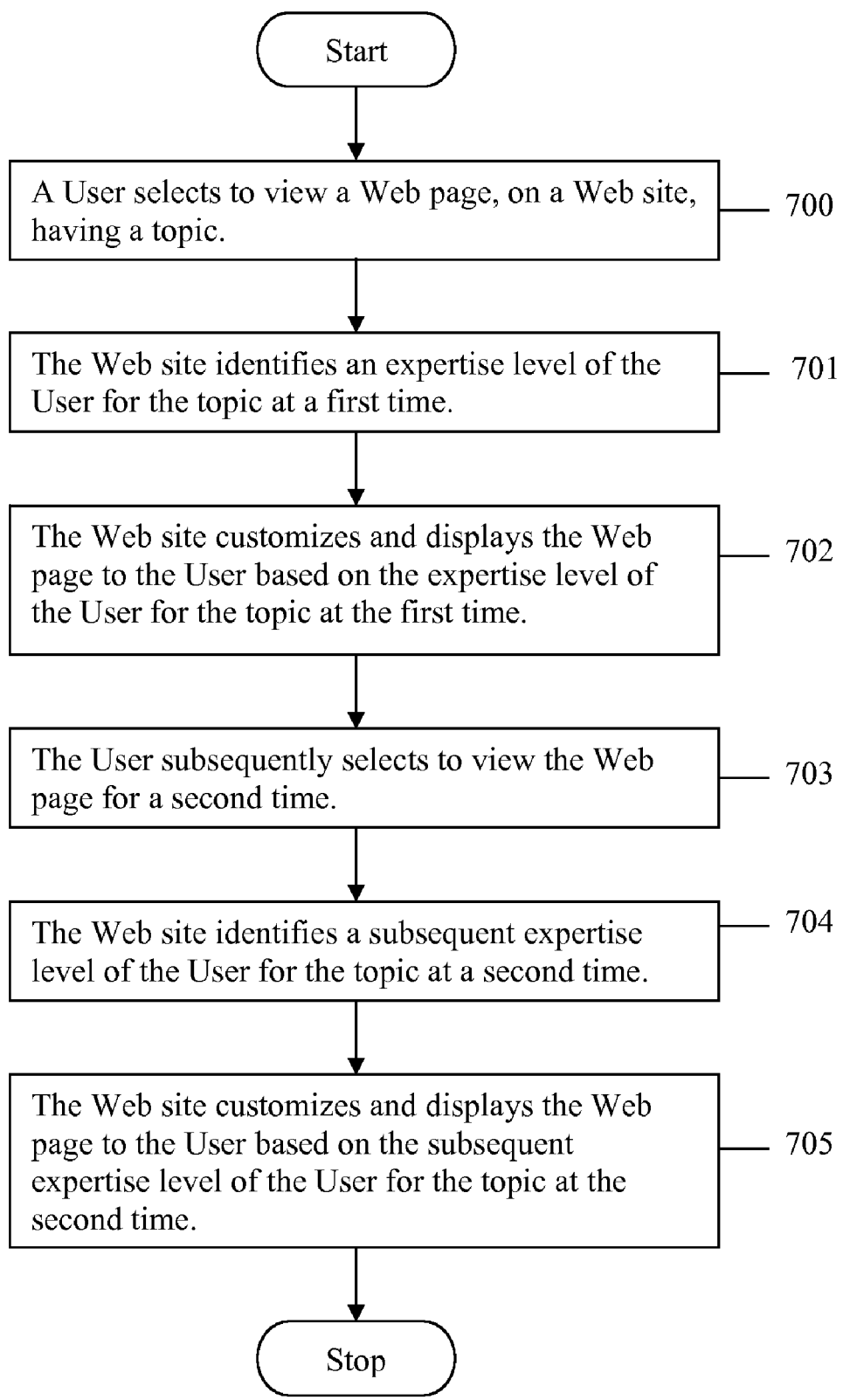
FIG. 7 is a flowchart illustrating a method for monitoring the expertise level of a User over time and customizing and transmitting a Web page based on the current expertise level of the User.

With reference to FIG. 7, a method is disclosed for customizing a Web page based on a User's dynamic expertise level. In this embodiment, a User selects to view a Web page, on a Web site, having a topic. (Step 700) The Web site identifies an expertise level of the User for the topic at a first time. (Step 701) The Web site customizes and displays the Web page to the User based on the expertise level of the User for the topic at the first time. (Step 702) The User selects to view the Web page at a subsequent time. (Step 703) The Web site identifies a subsequent expertise level of the User for the topic at the second time. (Step 704) The Web site customizes and displays the Web page to the User based on the subsequent expertise level. (Step 705) In preferred embodiments, the User's expertise level is monitored over time (the User's expertise level for a topic is likely, but not necessarily, going to increase over time) and used to customize the Web page to match the User's current expertise level for the topics presented on the Web page.

Figure 8:
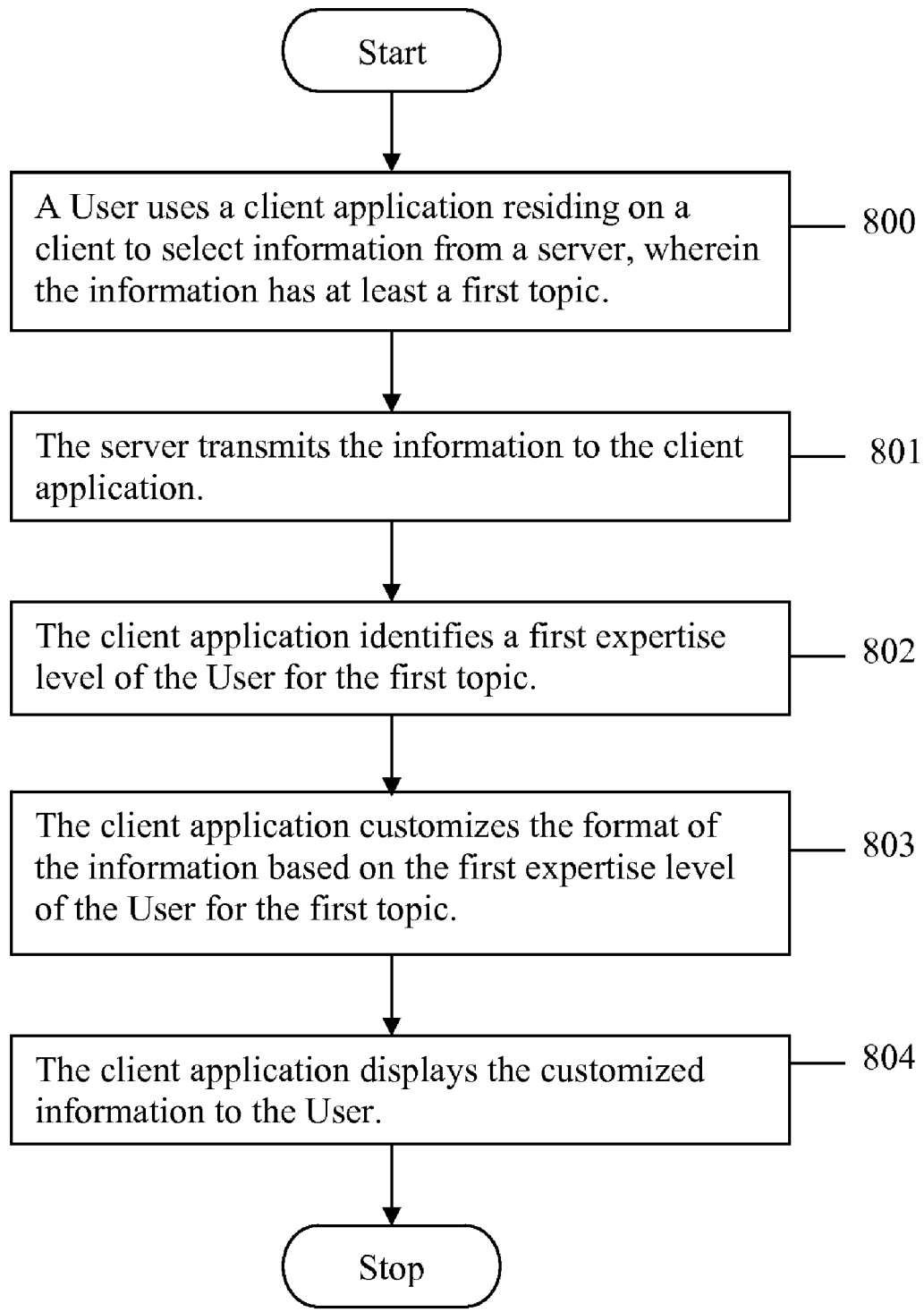
FIG. 8 is a flowchart illustrating a method for a client application to receive information from a server and the customize and present the information to a User.

With reference to FIG. 8, a method is disclosed for a client application to customize information received from a server for presentation to a User. In this embodiment, a User uses a client application to select information from a server, wherein the information has at least a first topic. (Step 800) The client application may be, for example, a browser or a smart client and may reside on a client having the resources to support the client application. The server transmits the information to the client application over a communication network or a combination of interconnected communication networks. (Step 801) The client application identifies a first expertise level of the User for the first topic. (Step 802) The client application customizes the format of the information based on the first expertise level of the User for the first topic. (Step 803) Finally, the client application displays the customized information to the User. (Step 804) In preferred embodiments, additional expertise level(s) of the User for additional topic(s) may be used in customizing the information. Other improvements may be made by storing User related data on the client for easy access by the client application.

Figure 9:
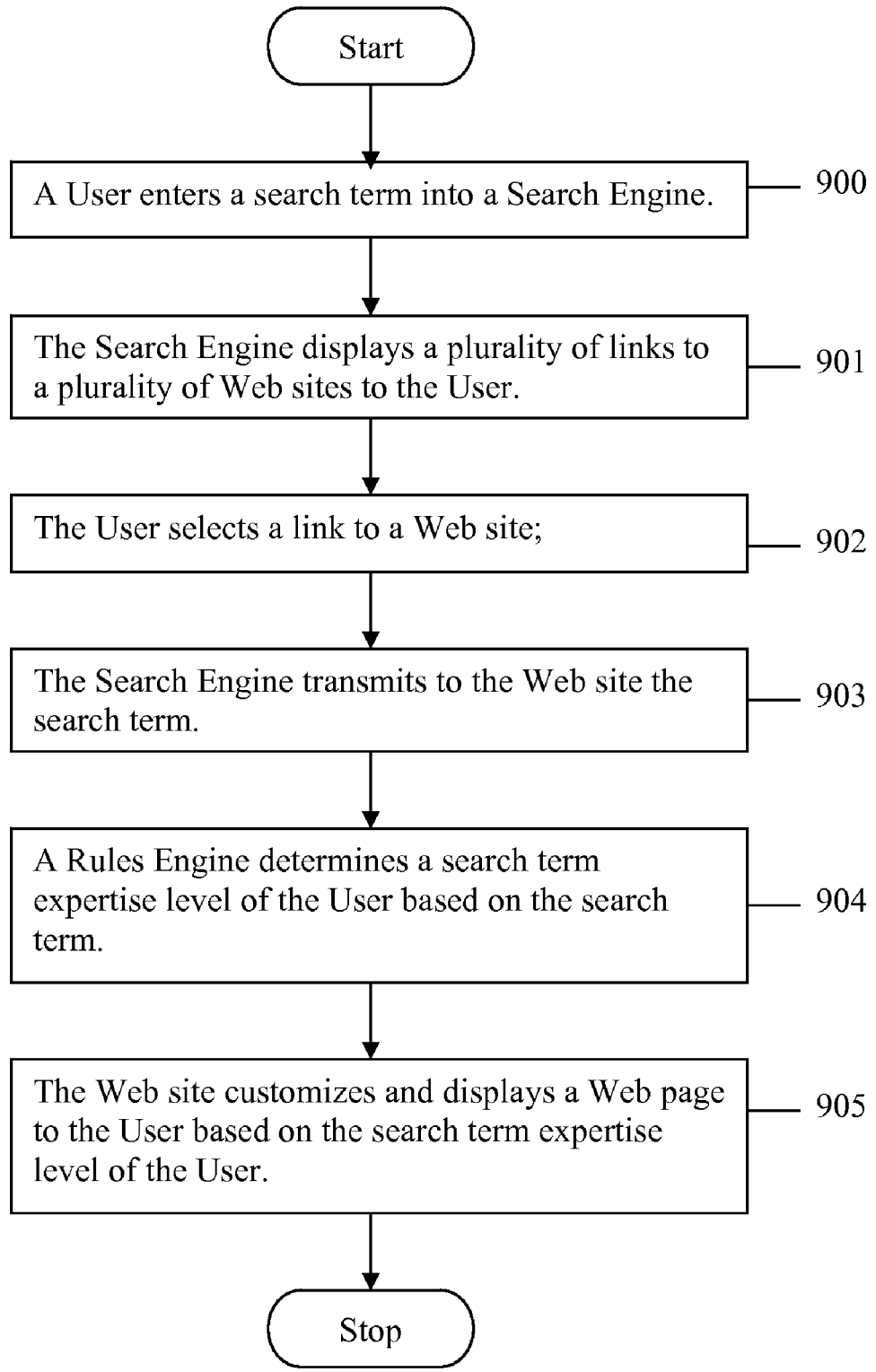
FIG. 9 is a flowchart illustrating a method for customizing and transmitting a Web page based on a search term entered by a User into a search engine.

With reference to FIG. 9, a method is disclosed for customizing a Web page based on a search term entered into a Search Engine. In this embodiment, a User enters a search term into a Search Engine. (Step 900) The Search Engine displays a plurality of links to a plurality of Web sites to the User. (Step 901) The User selects a link to a Web site. (Step 902) The Search Engine transmits to the Web site the search term entered by the User. (Step 903) A Rules Engine 107 determines a search term expertise level of the User based on the search term. (Step 904) The Web site may customize and transmit a Web page to the User based on the search term expertise level of the User. In preferred embodiments, the Web page is customized by also finding and using expertise levels of the User for one or more topics previously found by the Web site.

Figure 10:
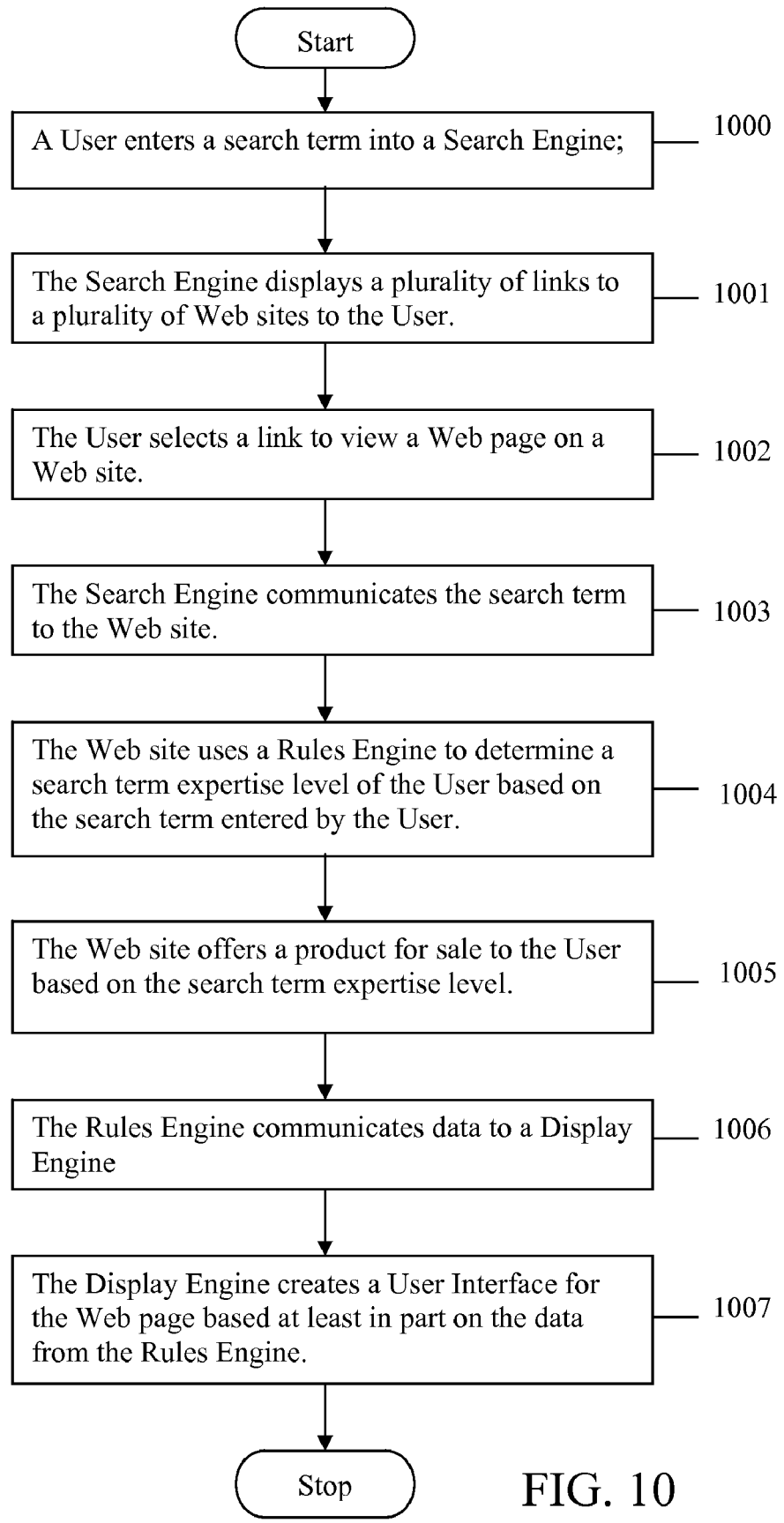
FIG. 10 is a flowchart illustrating a method for selecting a product to offer for sale to a User based on a search term entered by a User into a search engine.

With reference to FIG. 10, a method is disclosed for customizing a Web page based on a search term entered into a Search Engine by a User. In this embodiment, a User enters a search term into a Search Engine. (Step 1000) The Search Engine displays a plurality of links to a plurality of Web sites to the User. (Step 1001) The User selects a link to view a Web page on a Web site. (Step 1002) The Search Engine communicates the search term to the Web site. (Step 1003) The Web site uses a Rules Engine 107 to determine a search term expertise level of the User based on the search term used by the User. (Step 1004) The Rules Engine 107 may, for example, analyze the subject matter or technical level of the search term in determining the search term expertise. The Web site, preferably through a Display Engine, offers a product for sale to the User based on the search term expertise level of the User. (Step 1005) In a preferred embodiment, the product offered for sale to the User is also based on the expertise level of the User for various topics on the Web pages in the Web site.

Figure 11:
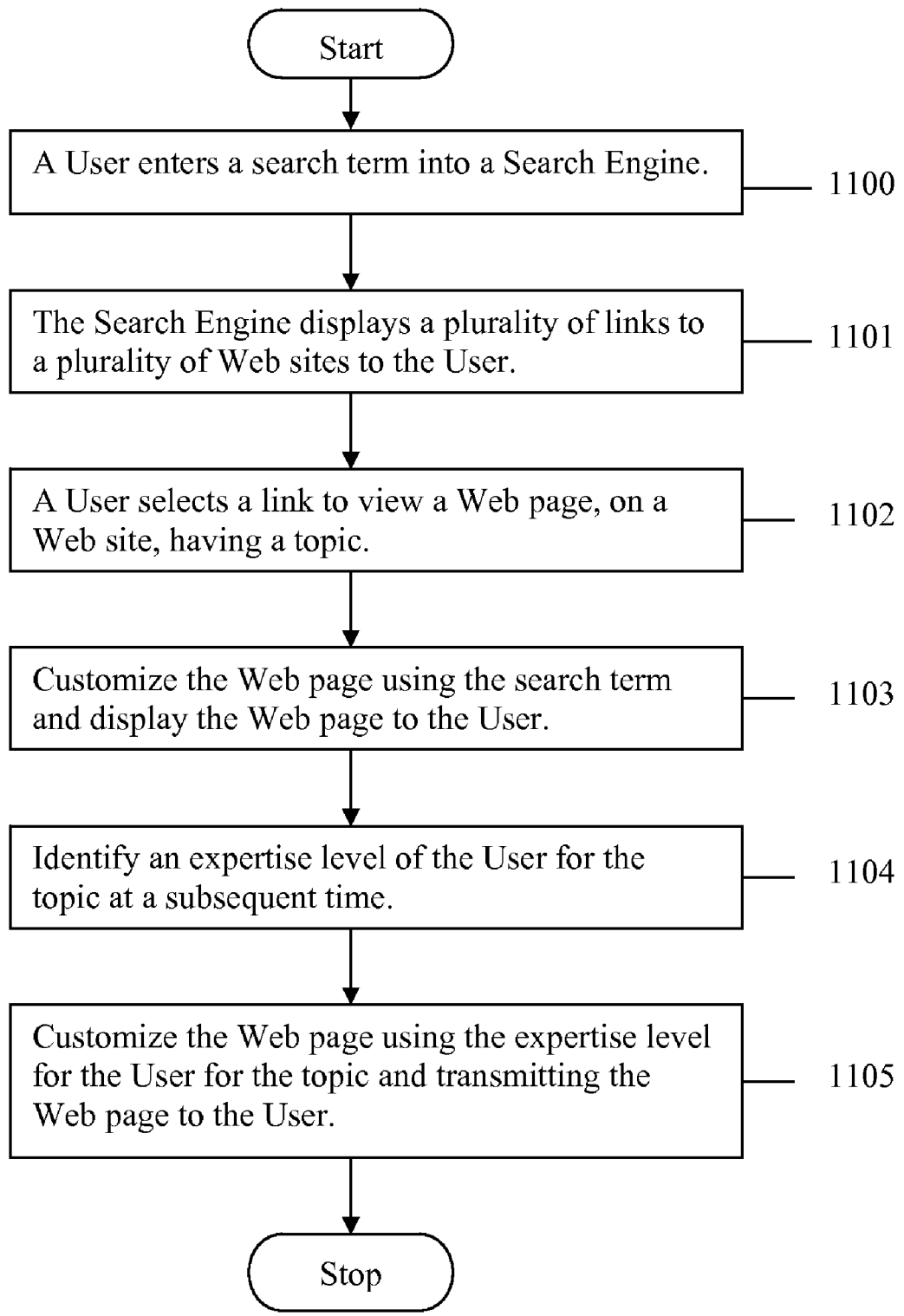
FIG. 11 is a flowchart illustrating a method for monitoring the expertise level of a User over time based on search terms entered into a search engine and customizing and transmitting a Web page based on the current expertise level of the User.

With reference to FIG. 11, a method is disclosed for customizing a Web page based on a search term entered into a Search Engine by a User. In this embodiment, a User enters a search term into a Search Engine. (Step 1100) The Search Engine displaying a plurality of links to a plurality of Web sites to the User. (Step 1101) The User selects a link to view a Web page, on a Web site, having a topic. (Step 1102) The Web site customizes the Web page using the search term and displays the Web page to the User. (Step 1103) The Web site identifies an expertise level of the User for the topic at a subsequent time. (Step 1104) Finally, the Web site customizes the Web page using the expertise level of the User for the topic at the subsequent time and displays the Web page to the User. (Step 1105) In a preferred embodiment the expertise level of the User is monitored over time and the design and customization of the Web page is based on the expertise level of the User for the topics at the time the Web page is selected.

Figure 12:
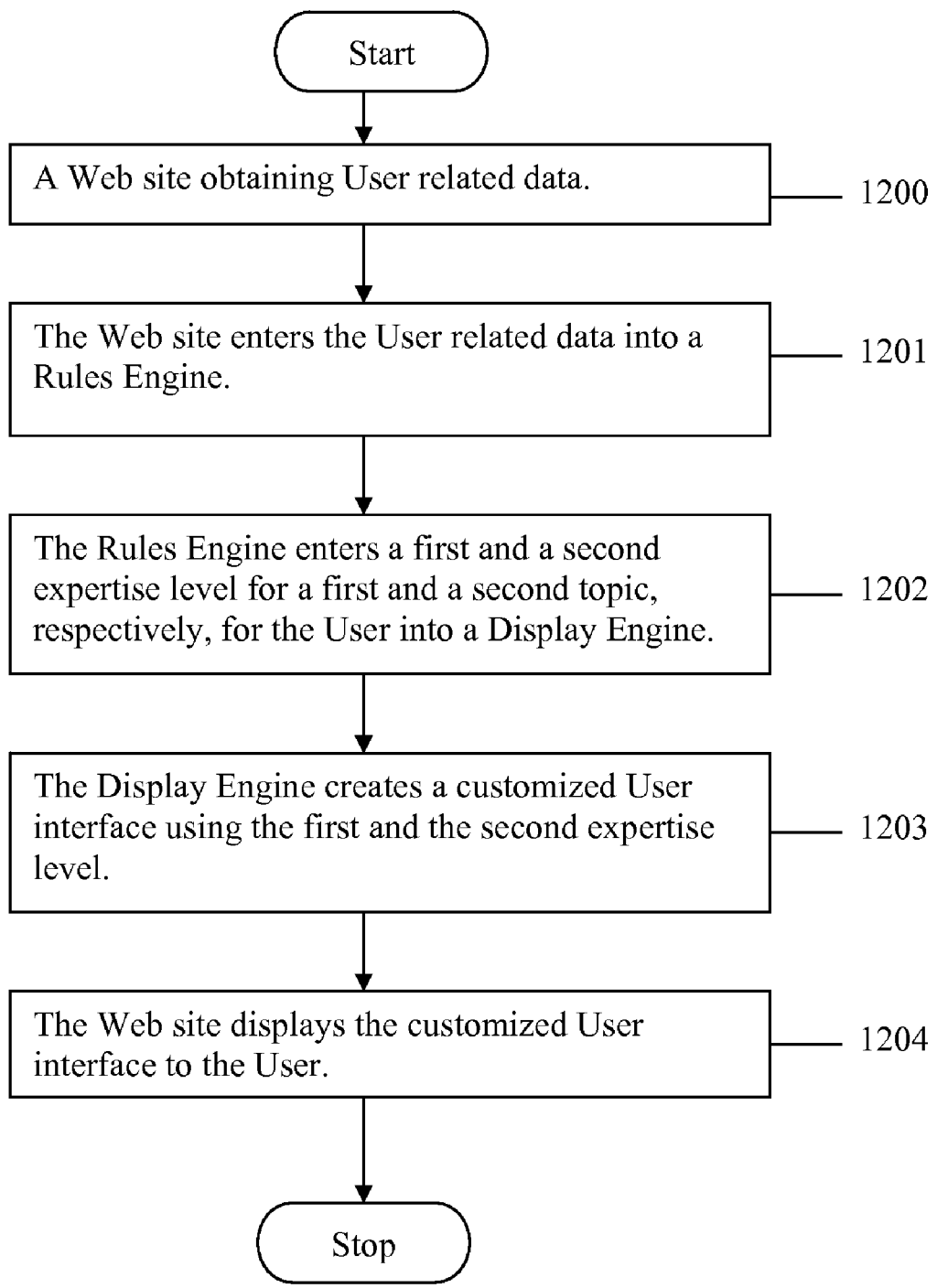
FIG. 12 is a flowchart illustrating a method for customizing and transmitting a User interface for a Web page, based on results from a Rules Engine.

With reference to FIG. 12, a method is disclosed of using an expertise level Rules Engine 107 to customize a User interface of a Web page. In this embodiment a Web site obtains User related data. (Step 1200) The Web site enters the User related data into a Rules Engine 107. (Step 1201) The Rules Engine 107 enters a first and a second expertise level for a first and a second topic, respectively, for the User into a Display Engine. (Step 1202) The Display Engine creates a customized User interface using the first and the second expertise level. (Step 1203) Finally, the Web site displays the customized User interface to the User. (Step 1204) In a preferred embodiment, the usage patterns of the User on the Web site are analyzed to determine different expertise levels of the User for the different topics on the Web pages.

Figure 2:
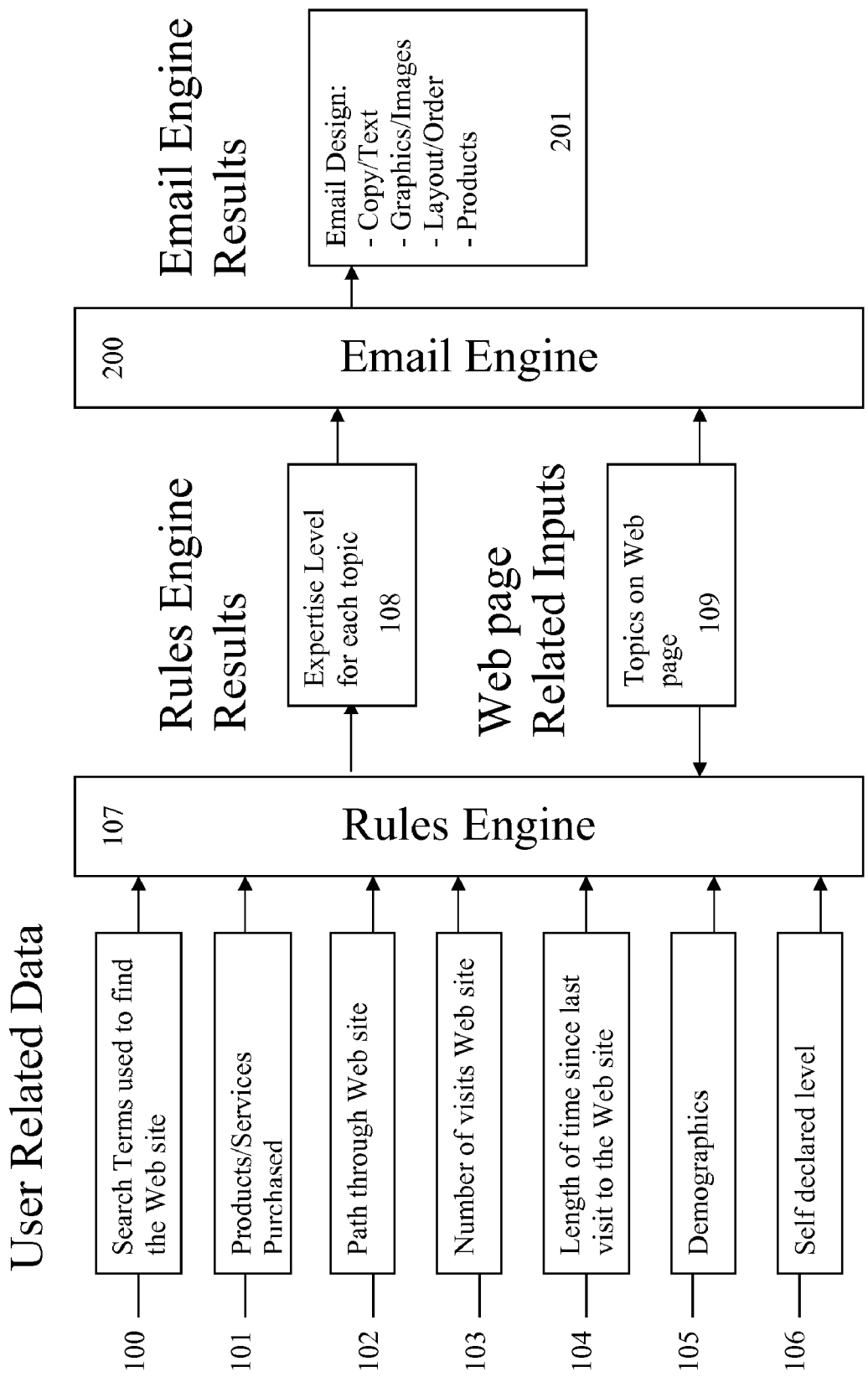
FIG. 2 is a block diagram illustrating the flow of information through a process for customizing an email based on a User's expertise level.
Figure 13:
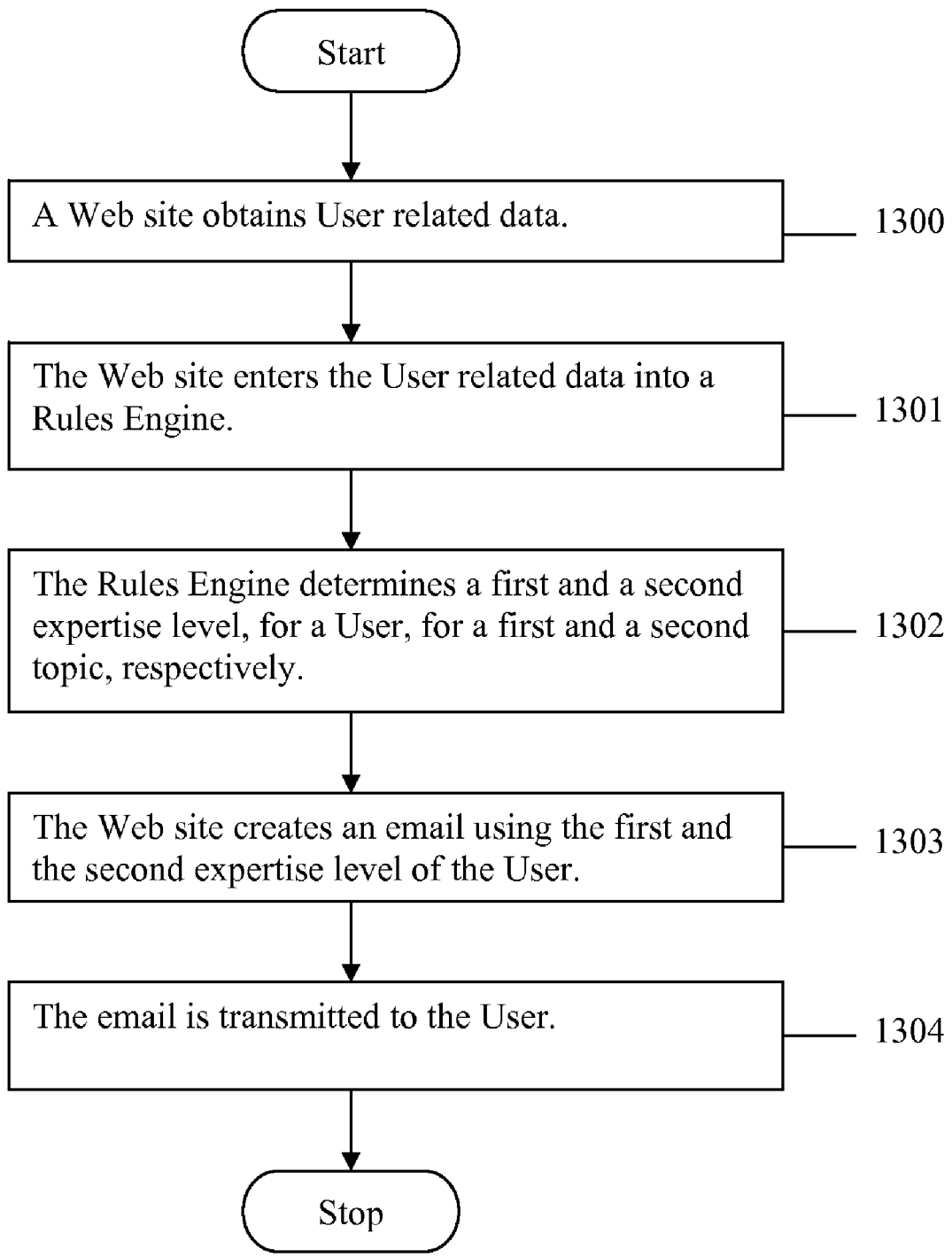
FIG. 13 is a flowchart illustrating a method for customizing and transmitting an email to a User based on the expertise level of the User as determined by a Rules Engine.

With reference to FIGS. 2 and 13, a method is disclosed of using an expertise level Rules Engine 107 to customize an e-mail to a User. In this embodiment a Web site obtains some User related data. (Step 1300) The Web site enters the User related data into a Rules Engine 107. (Step 1301) The Rules Engine 107 determines a first and a second expertise level, for a User, for a first and a second topic, respectively. (Step 1302) An Email Engine 200 creates an email using the first and the second expertise level of the User. (Step 1303) The Email Engine 200 customizes the copy/text, graphics, images, layout, template and offered products 201 in the email. Finally, the Web site transmits the email to the User. (Step 1304) In a preferred embodiment, the expertise level of the User may be determined for the topics in the email and then the contents of the email may be matched to the expertise level of the User to the topics in the email.

Figure 3:
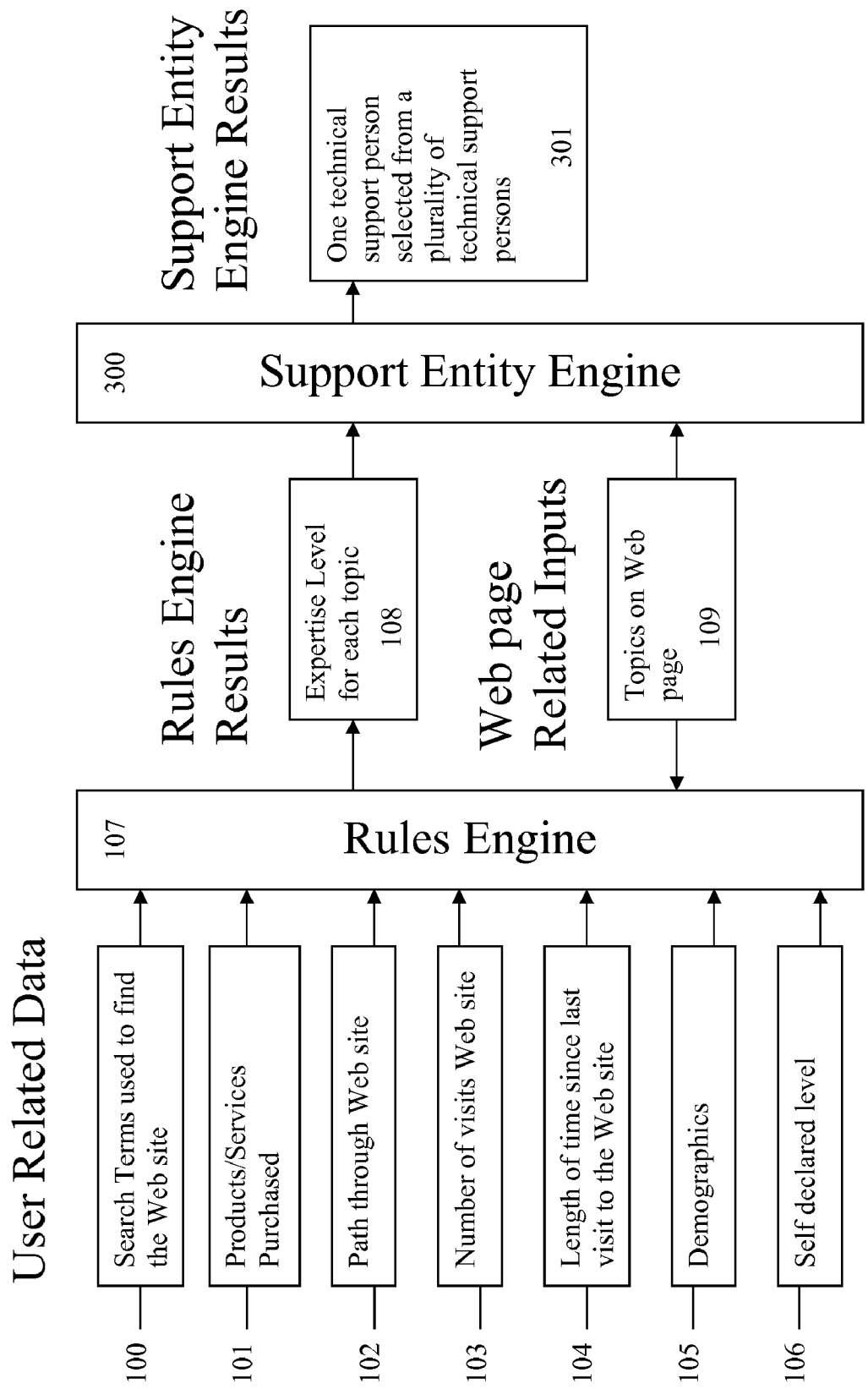
FIG. 3 is a block diagram illustrating the flow of information through a process for routing calls in a customer service call center based on a User's expertise level.
Figure 14:
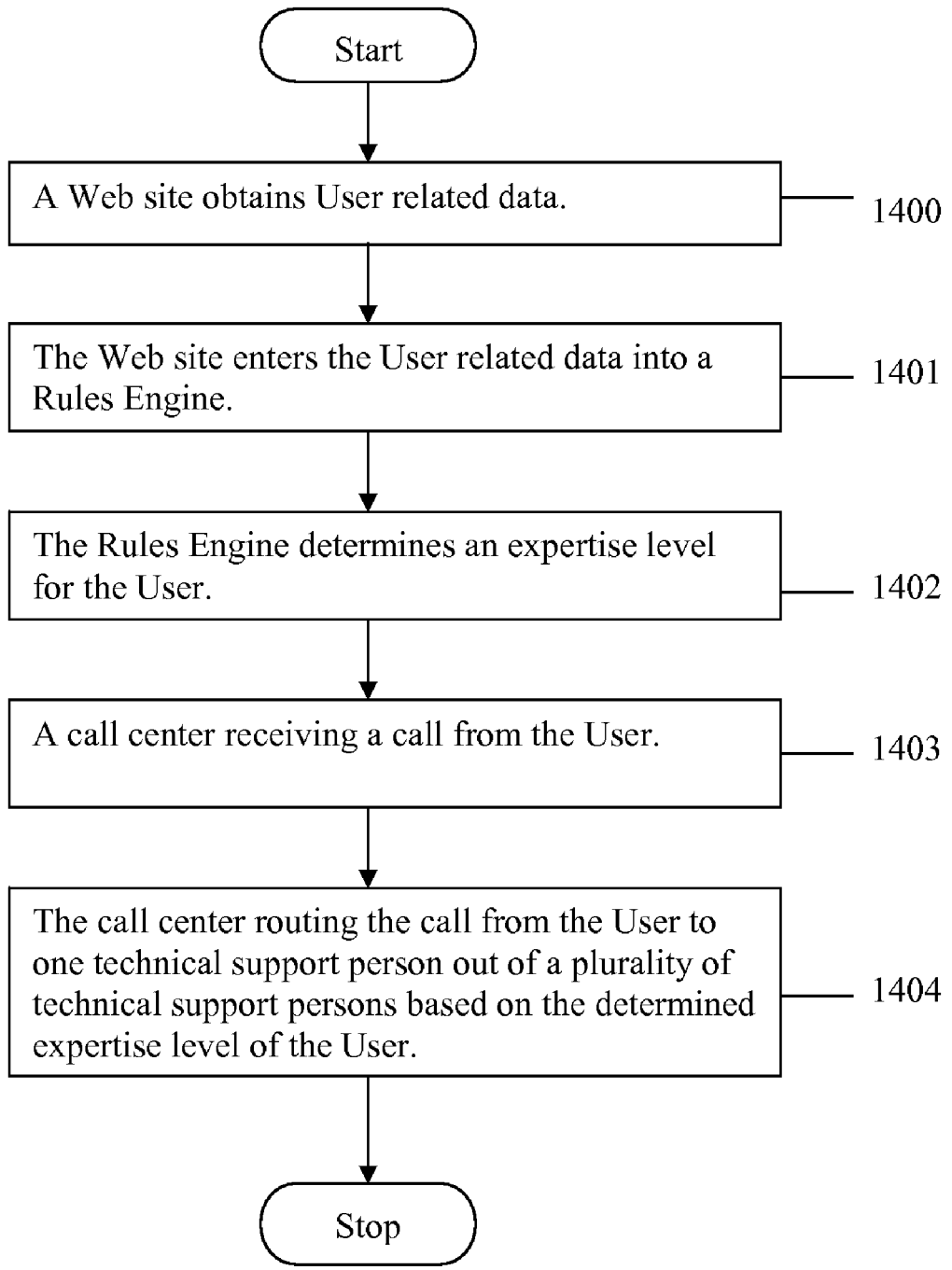
FIG. 14 is a flowchart illustrating a method for routing a call through a call center based on the expertise level of the User (caller)

With reference to FIGS. 3 and 14, a method is disclosed of using an expertise level Rules Engine 107 to customize the handling of a support inquiry to a support entity. In this embodiment a Web site obtains some User related data. (Step 1400) The Web site enters the User related data into a Rules Engine 107. (Step 1401) The Rules Engine 107 determines an expertise level for the User. (Step 1402) A support entity receives a support inquiry from the User. (Step 1403) Using a Call Center Engine 300, the support entity routes the support inquiry from the User to one technical support person out of a plurality of technical support persons based on the determined expertise level of the User. (Step 1404) This method increases the efficiency of the support entity by immediately matching advanced Users with more experience technical support persons that are more likely to be able to solve the issues of an advanced User. The support entity may be, for example, a call center or a web board. The support inquiry may be, for example, a service call to a call center or an electronic message to a web board.

Figure 15:
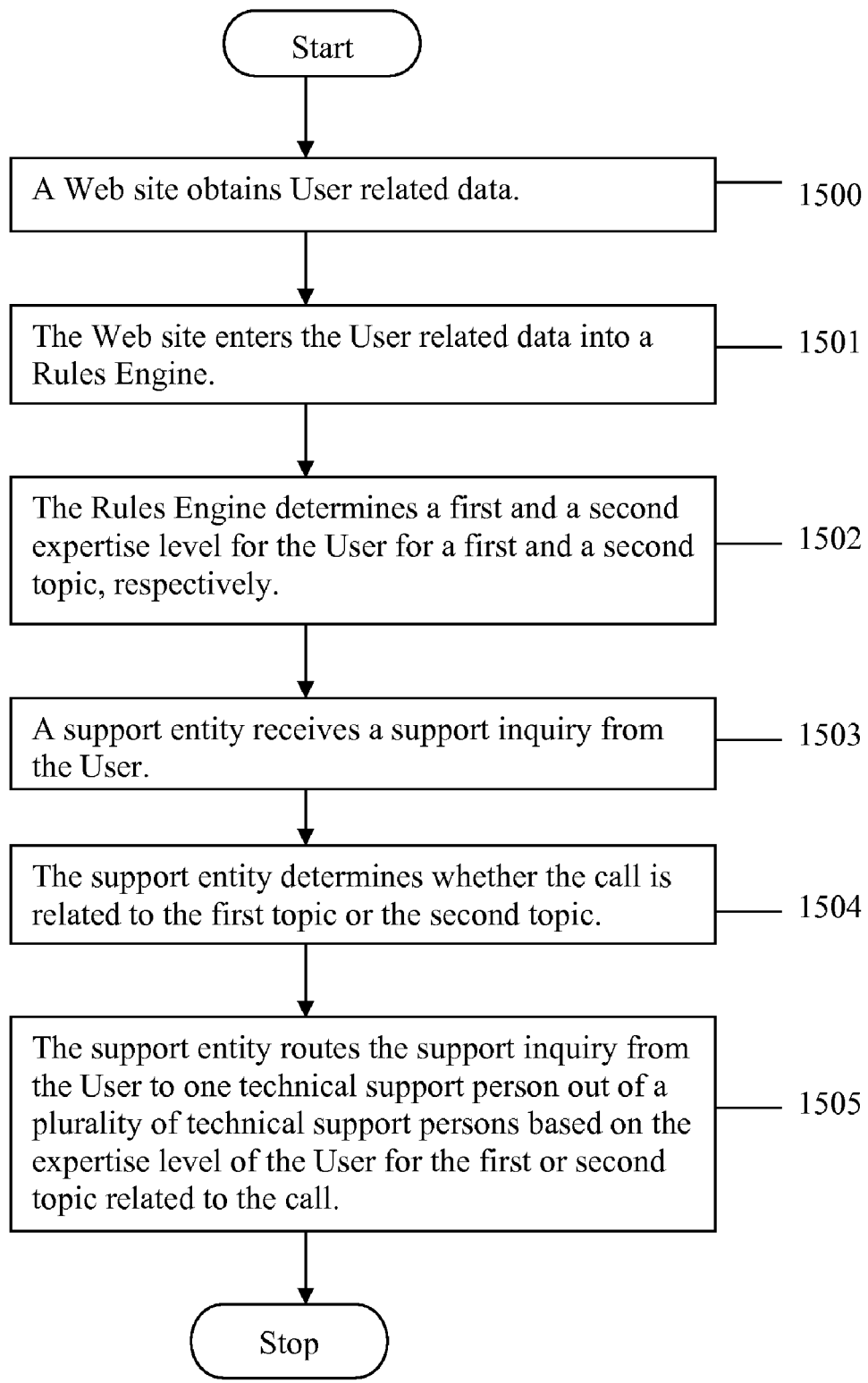
FIG. 15 is a flowchart illustrating a method for monitoring the expertise level of a User over time and routing the User's call through a call center based on the current expertise level of the User (caller).

With reference to FIG. 15, a method is disclosed for using an expertise level Rules Engine 107 to customize the handling of service calls to a call center. In this embodiment, a Web site obtains some User related data. (Step 1500) The Web site enters the User related data into a Rules Engine 107. (Step 1501) The Rules Engine 107 determines a plurality of expertise levels for the User for a plurality of topics. (Step 1502) A call center receives a call from the User. (Step 1503) A Call Center Engine 300 determines whether the call is related to one of the plurality of topics. (Step 1504) Finally, the call center routes the call from the User to one technical support person out of a plurality of technical support persons based on the expertise level of the User for the topic of the service call. (Step 1505) In a preferred embodiment, an expertise level of the User is determined for as many topics as possible on the Web site so that an expertise level of the User for the topic of the service call is more likely to be known.

In view of the foregoing, it will be understood by those skilled in the art that the methods of the present invention can facilitate the presentation of information at an appropriate level to a User. The information may be presented to the User on a Web page, an email or via a support entity. The above-described embodiments have been provided by way of example, and the present invention is not limited to these examples. In order to provide a context for the invention, Web sites, Web pages and the Internet where used in many of the examples to describe particular aspects of the invention. However, many of the concepts presented are not limited to Web sites, Web pages and the Internet and may also be accomplished using servers, client applications and communication networks in general. Multiple variations and modification to the disclosed embodiments will occur, to the extent not mutually exclusive, to those skilled in the art upon consideration of the foregoing description. Such variations and modifications, however, fall well within the scope of the present invention as set forth in the following claims.

What is claimed is:

1. A method, comprising the steps of:
    a) receiving, from a web site, usage pattern data related to content on the web site, wherein the content comprises one or more topics within one or more web pages within the web site;
    b) calculating an expertise level for each of the one or more topics, wherein the expertise level is calculated by a rules engine,
        wherein the rules engine comprises one or more software packages on a server computer communicatively coupled to a network and wherein the rules engine is configured to analyze the usage pattern data to determine the expertise level;
    c) customizing an email content, wherein the email content is customized by an email engine and wherein the email engine comprises one or more software packages on the server computer configured to alter text, graphics, images, a layout, a template or offered products in an email responsive to receiving the expertise level calculated by the rules engine for each of the one or more topics; and
    d) transmitting the email content, as customized in the email by the email engine, to an email software application displayed on a client computer communicatively coupled to the network.

2. The method of claim 1, wherein the expertise level for each of the one or more topics is self declared by a user.

3. The method of claim 1, wherein the expertise level for each of the one or more topics is determined using at least one purchase made by a user.

4. The method of claim 1, wherein the expertise level for each of the one or more topics is determined using a path of a user through the web site.

5. The method of claim 1, wherein the email content includes the one or more topics at the same technical level as the expertise level determined by the rules engine.

6. The method of claim 1, wherein a plurality of expertise levels are determined by the rules engine for a plurality of topics.

7. A method, comprising the steps of:
    a) receiving, from a eb site, usage pattern data related to content on the web site, wherein the content comprises one or more topics within one or more web pages within the web site;
    b) calculating an expertise level for each of the one or more topics, wherein the expertise level is calculated by a rules engine,
        wherein the rules engine comprises one or more software packages on a server computer communicatively coupled to a network and wherein the rules engine is configured to analyze the usage pattern data to determine the expertise level;
    c) customizing a technical content of an email, wherein the technical content comprises text unrelated to products offered, wherein the technical content is customized by an email engine and wherein the email engine comprises one or more software packages on the server computer configured to alter text, graphics, images, a layout or a template in the email responsive to receiving the expertise level calculated by the rules engine for each of the one or more topics; and
    d) transmitting the technical content, as customized in the email by the email engine, to an email software application displayed on a client computer communicatively coupled to the network.

8. A method, comprising the steps of:
    a) receiving usage pattern data from a first web site, and additional usage pattern data from a second web site, wherein the usage pattern data, and the additional usage pattern data, are related to content on the first web site and the second web site, respectively, and wherein the content comprises one or more topics within one or more web pages within the first web site and the second web site;
    b) calculating an expertise level for each of the one or more topics, wherein the expertise level is calculated by a rules engine,
        wherein the rules engine comprises one or more software packages on a server computer communicatively coupled to a network and wherein the rules engine is configured to analyze the usage pattern data and the additional usage pattern data to determine the expertise level;
    c) customizing an email content, wherein the email content is customized by an email engine and wherein the email engine comprises one or more software packages on the server computer configured to alter text, graphics, images, a layout, a template or offered products in an email responsive to receiving the expertise level calculated by the rules engine for each of the one or more topics; and
    d) transmitting the email content, as customized in the email by the email engine, to an email software application displayed on a client computer communicatively coupled to the network.

9. A method, comprising the steps of:
    a) receiving, from a web site, usage pattern data related to content on the web site, wherein the content comprises one or more topics within one or more web pages within the web site;
    b) calculating an expertise level for each of the one or more topics, wherein the expertise level is calculated by a rules engine,
        wherein the rules engine comprises one or more software packages on a server computer communicatively coupled to a network and wherein the rules engine is configured to analyze the usage pattern data to determine the expertise level;
    c) customizing an email content, wherein the email content is customized by an email engine and wherein the email engine comprises one or more software packages on the server computer configured to offer a product in an email responsive to receiving the expertise level calculated by the rules engine for each of the one or more topics; and d) transmitting the email content, as customized in the email by the email engine, to an email software application displayed on a client computer communicatively coupled to the network.

10. A method, comprising the steps of:
a) receiving, from a web site, usage pattern data related to content accessed on a first visit to the web site, wherein the content comprises one or more topics within one or more web pages within the web site;
b) receiving, from the web site, additional usage pattern data on a second visit to the web site, wherein the additional usage pattern data is related to the content accessed on the second visit to the web site;
c) calculating an expertise level for each of the one or more topics, wherein the expertise level is calculated by a rules engine,
  wherein the rules engine comprises one or more software packages on a server computer communicatively coupled to a network and wherein the rules engine is configured to analyze the usage pattern data to determine the expertise level;
d) customizing an email content, wherein the email content is customized by an email engine and wherein the email engine comprises one or more software packages on the server computer configured to alter text, graphics, images, a layout, a template or offered products in an email responsive to receiving the expertise level calculated by the rules engine for each of the one or more topics; and
e) transmitting the email content, as customized in the email by the email engine, to an email software application displayed on a client computer communicatively coupled to the network.

* * * * *